United States Patent [19]
Han

[11] Patent Number: 6,068,570
[45] Date of Patent: May 30, 2000

[54] VARIABLE SPEED TRANSMISSION SYSTEM AND DIFFERENTIAL

[76] Inventor: Kyung Soo Han, 11100 Old Carriage Rd., Glen Arm, Md. 21057

[21] Appl. No.: 09/336,597

[22] Filed: Jun. 21, 1999

[51] Int. Cl.[7] .................................................. F16H 29/04
[52] U.S. Cl. ............................................. 475/207; 74/117
[58] Field of Search .................................... 475/198, 207; 74/117

[56] References Cited

U.S. PATENT DOCUMENTS

| | | |
|---|---|---|
| 2,547,453 | 4/1951 | Egy . |
| 4,077,278 | 3/1978 | Combastet . |
| 4,109,551 | 8/1978 | Nemec . |
| 4,802,376 | 2/1989 | Stidworthy . |
| 4,961,719 | 10/1990 | Wildermuth . |
| 5,016,493 | 5/1991 | Han . |
| 5,108,352 | 4/1992 | Pires . |
| 5,116,292 | 5/1992 | Han . |
| 5,169,359 | 12/1992 | Han . |
| 5,937,701 | 8/1999 | Mimura ...................................... 74/117 |

FOREIGN PATENT DOCUMENTS

| | | |
|---|---|---|
| 989644 | of 0000 | Canada . |
| 1323617 | of 0000 | France . |
| 2638801 | of 0000 | France . |

*Primary Examiner*—Dirk Wright
*Attorney, Agent, or Firm*—Harpman & Harpman

[57] ABSTRACT

An arrangement of multiple gears forming a transmission and differential system for variable and compensated speed output and direction from a constant or variable source. Control of output speed, direction and source by selective adjustment with the system at related system components. Adjustment of inter-related orbital cam paths provide for selective variable output from a given input source. Compensated variable output derives from combining the generated variable output with the unimpeded source input.

15 Claims, 11 Drawing Sheets

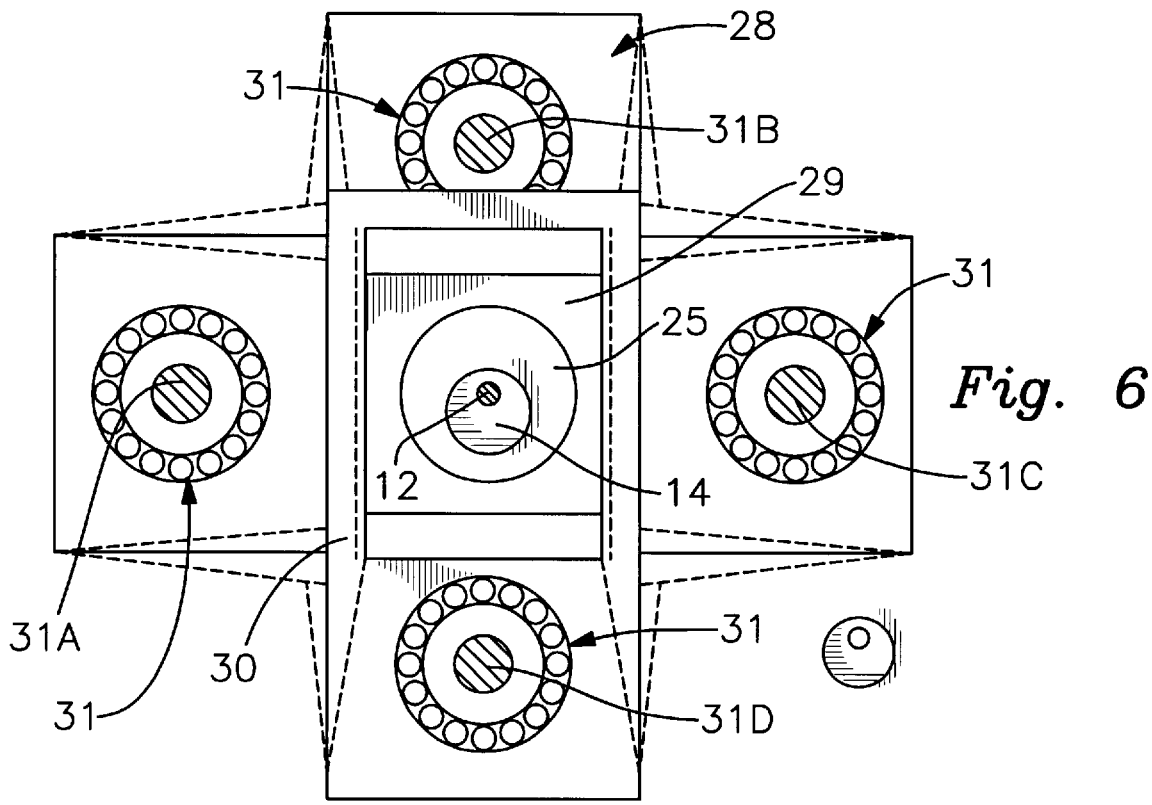
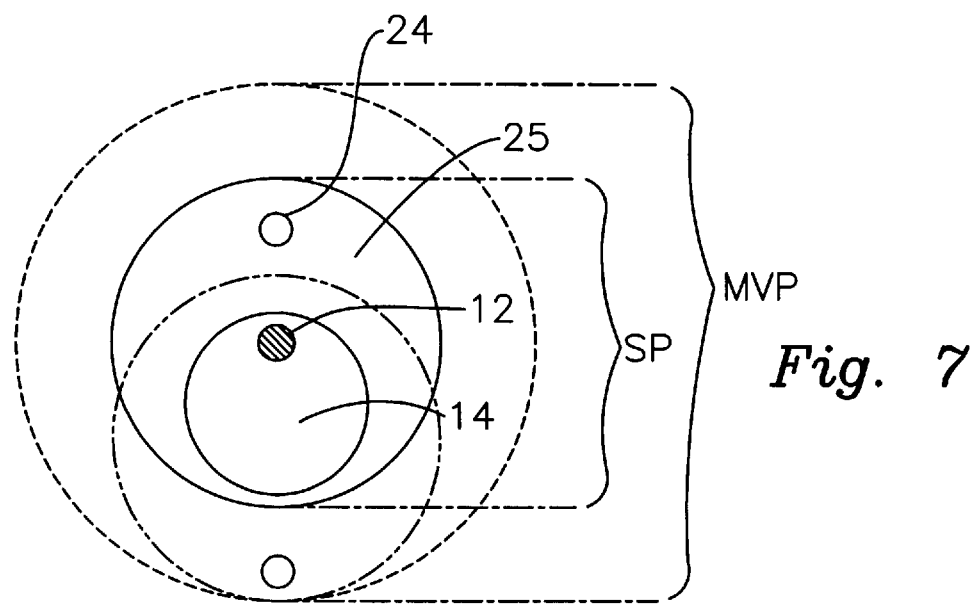

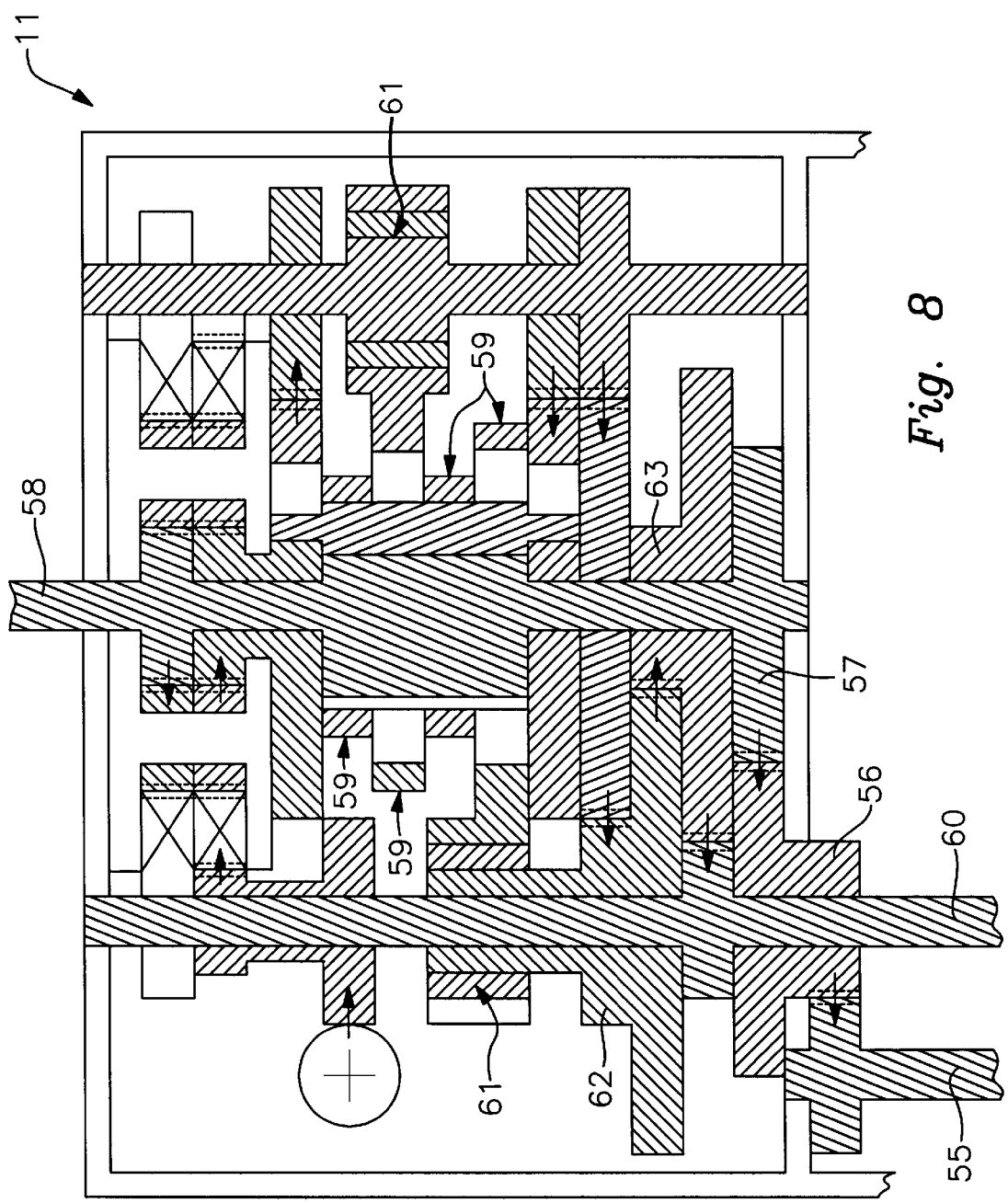

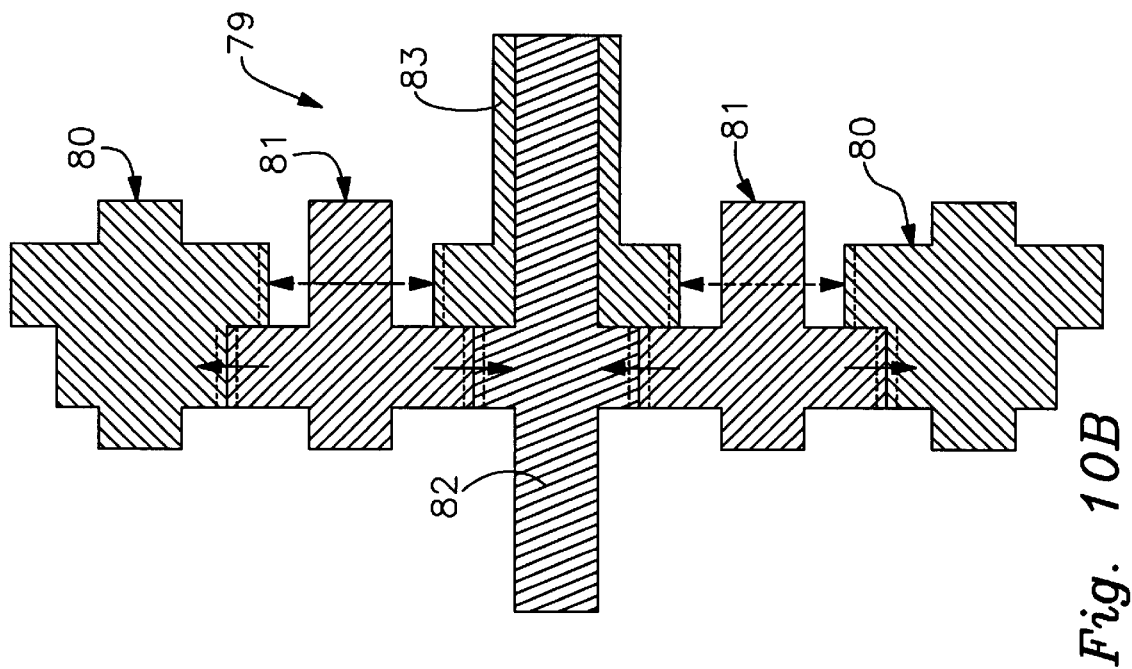
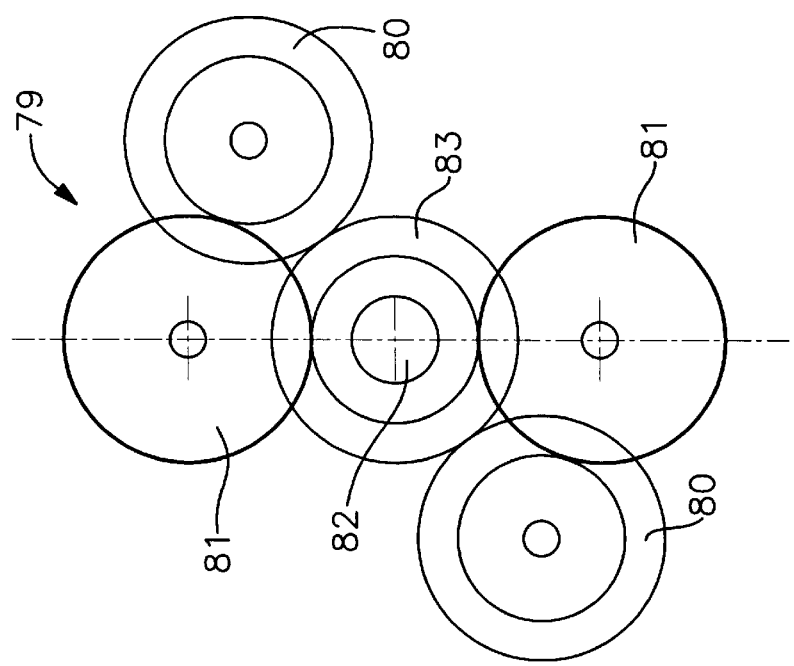
Fig. 10B
Fig. 10A

VARIABLE SPEED TRANSMISSION SYSTEM AND DIFFERENTIAL

BACKGROUND OF THE INVENTION

1. Technical Field

This device is related to gear transmissions that provide for adjustable output from a power input source for useful control and output by different relative gear ratios for varied use applications.

2. Description of Prior Art

Prior art devices of this type have relied on a number of different gear configurations to impart increase or decrease output ratios from a fixed or variable input source, see for example U.S. Pat. Nos. 2,547,453, 4,077,278, 4,109,551, 4,802,376, 4,916,975, 4,961,719, 5,016,493, 5,108,352, 5,116,292, and 5,169,359 and foreign patents Canadian 989,644, French 2,638,801 and 1,323,617.

In applicant's own prior art U.S. Pat. Nos. 5,116,292, 5,106,493 and 5,308,293 illustrate the orbital path change to determine variable output.

In U.S. Pat. No. 4,961,719 a variable drive transmission is disclosed using a carrier member mounted on a rotatable crank shaft with a number of spaced pivotally mounted segments that can selectively engage a central sprocket with multiple chain engagement sprockets rotatably secured to each segment.

In U.S. Pat. No. 2,547,453 a variable speed transmission can be seen having a rotatable cage with multiple enclosed cranks. An annular cam is engaged by the cranks from which selective output can be determined.

U.S. Pat. No. 4,077,278 is directed towards dividing input rotational force into two rotational components. An output differential combines the divided components rotational force.

In U.S. Pat. No. 4,916,975 a torque convertor is illustrated with two different gears, input is transferred through each differential gear by planetary shafts which are aligned co-axially to one another.

In French Patent 1,323,619 a gear arrangement having a pair of interconnected differential gear segments is shown.

In Canadian Patent 989,644 a rotary mesh translating device is shown that uses two differentials with self-locking rotary coupler.

French Patent 2,638,801 is directed towards two different mechanical power convertors wherein the cage of the first differential receives input from a motor, converts same to output via interengaging gear to input shafts of the second differential with output from the cage of the second differential determined therefrom.

SUMMARY OF THE INVENTION

A variable output transmission system having speed engine braking, direction and differential output sections enabling incremental variable and compensated variable output from constant or variable input source.

DESCRIPTION OF THE DRAWINGS

FIG. 6 is a front plan view of the center input cam output transfer assemblies;

FIG. 7 is a graphical representation of the variable orbital output paths of the center input cam assembly;

FIG. 8 is a partial cross-sectional graphic illustrative view of a compensated variable gear assembly;

FIG. 10A is a cross-sectional view of an alternate form of a differential assembly;

FIG. 10B is a graphic illustration of the gear set on engagement relationship set forth in FIG. 10A;

DESCRIPTION OF THE PREFERRED EMBODIMENT

Figure 1:
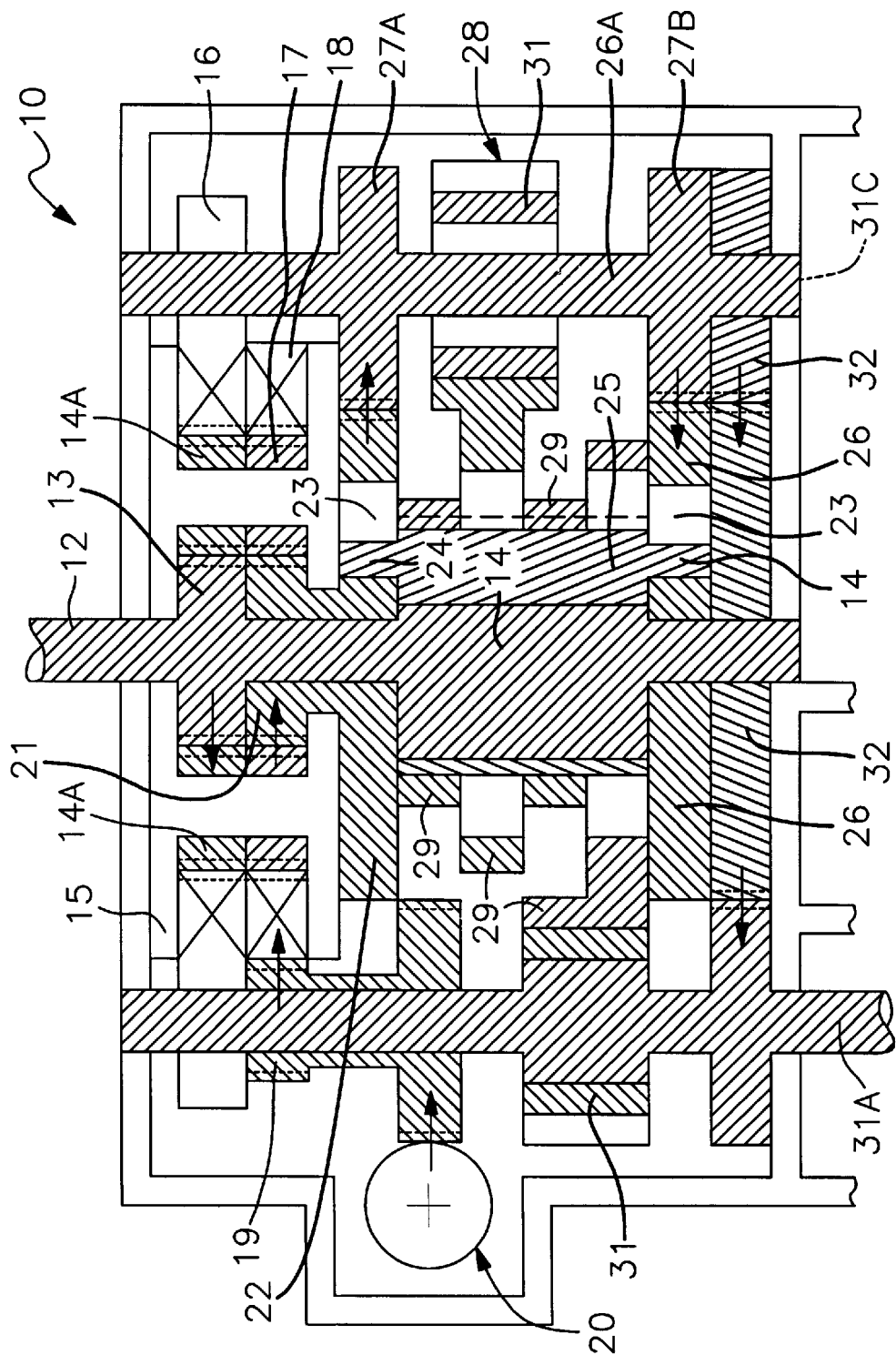
FIG. 1 is a partial cross-sectional graphic illustrative view of a variable speed gear assembly portion of the invention.
Figure 2:
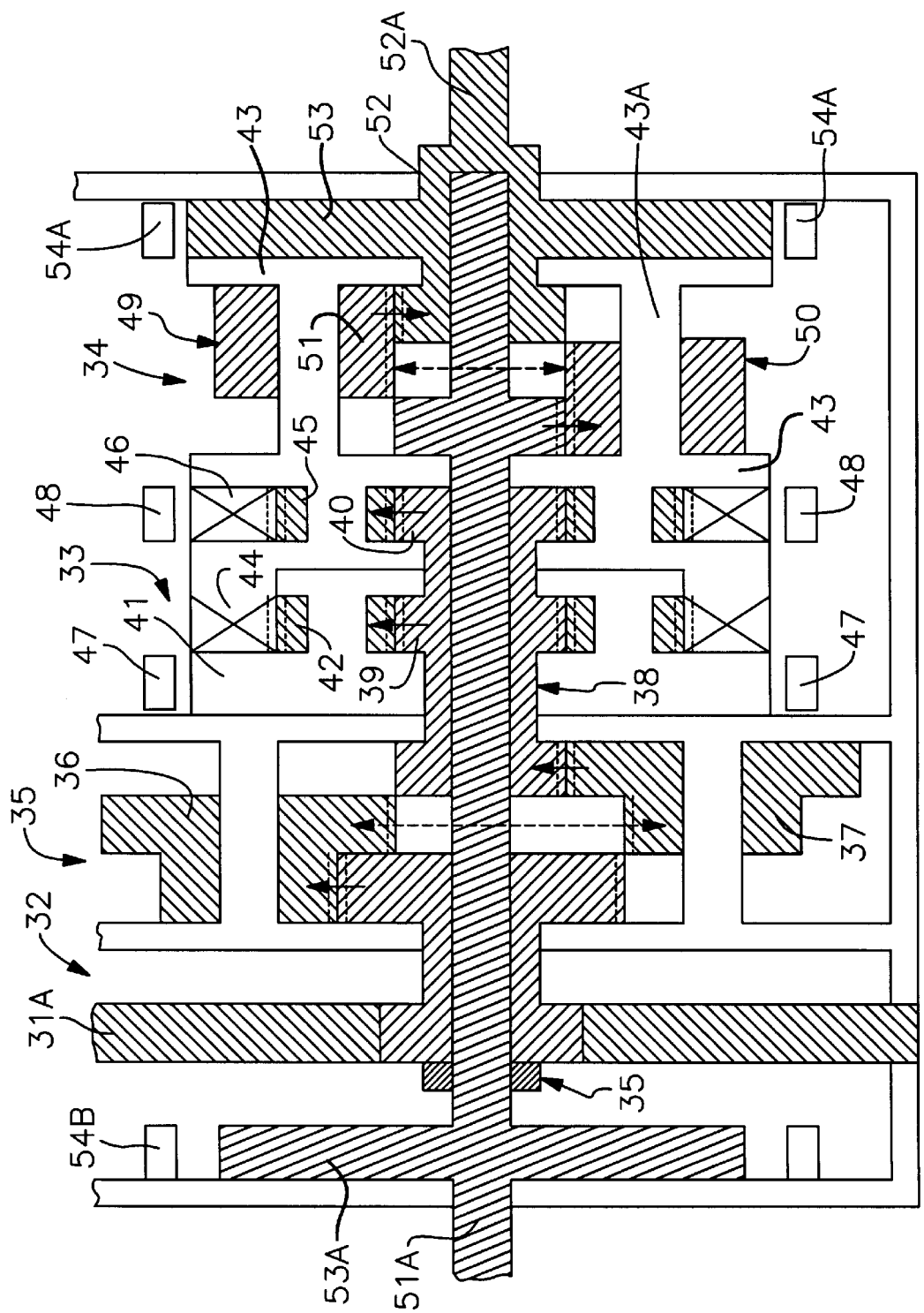
FIG. 2 is a partial cross-sectional graphic illustrative view of an engine braking, directional and differential portion of the invention.
Figure 3:
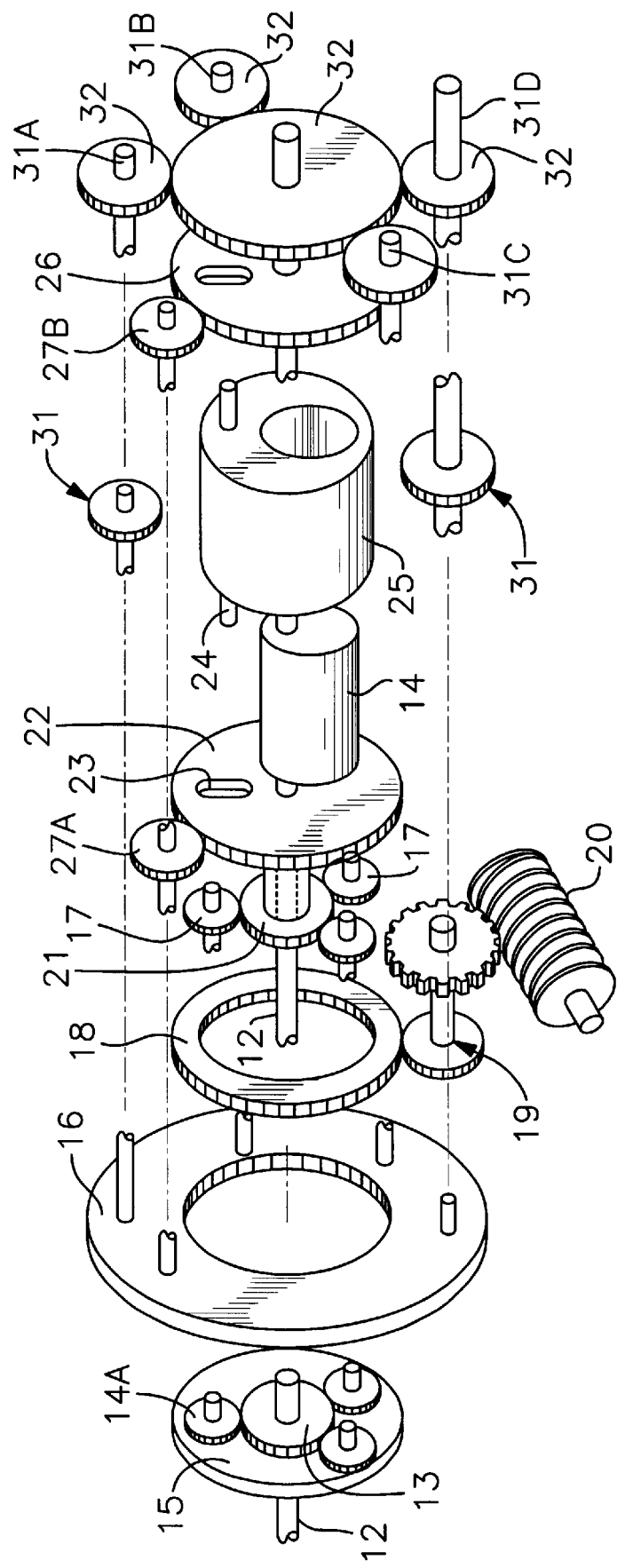
FIG. 3 is an exploded perspective view of the center input shaft and associated variable cam assemblies.

Referring to FIGS. 1–7 of the drawings, a principle embodiment 10 of the invention is illustrated and in FIGS. 8–11 a compensated alternate embodiment 11 of the invention is illustrated. The principle embodiment 10 as seen in FIGS. 1–3 of the drawings having a main input shaft 12 with a drive gear 13 and inner cam portion 14 thereon. The drive gear 13 has a plurality of interengaging planetary gears 14A on a drive bracket 15, a fixed ring gear 16 engages the planetary gears 14A rotating same. A secondary set of planetary gears 17 on the rotating drive bracket 15 are engaged with an adjustable ring gear 18 controlled by a variable input gear 19. A worm input gear 20 selectively drives the variable input gear 19 to regulate output, best seen in FIG. 1 of the drawings. The secondary set of planetary gears 17 also engage a central sun gear 21 having a cam control gear portion 22 extending therefrom. The cam control gear portion 22 has a slot at 23 therein for registration with a pin 24 on an outer cam 25 in which the cam portion 14 of the input shaft 12 is positioned.

Figure 4:
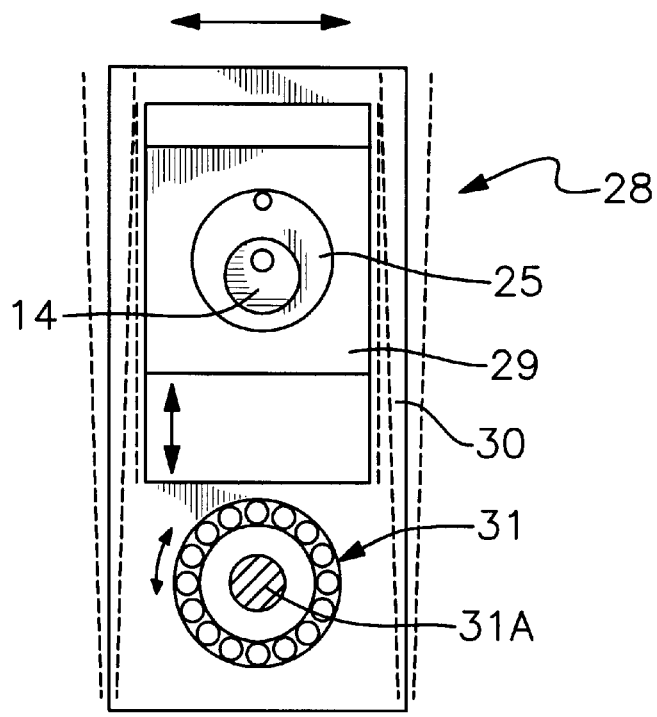
FIG. 4 is a front elevational view of the center input cam output transfer assembly.
Figure 5:
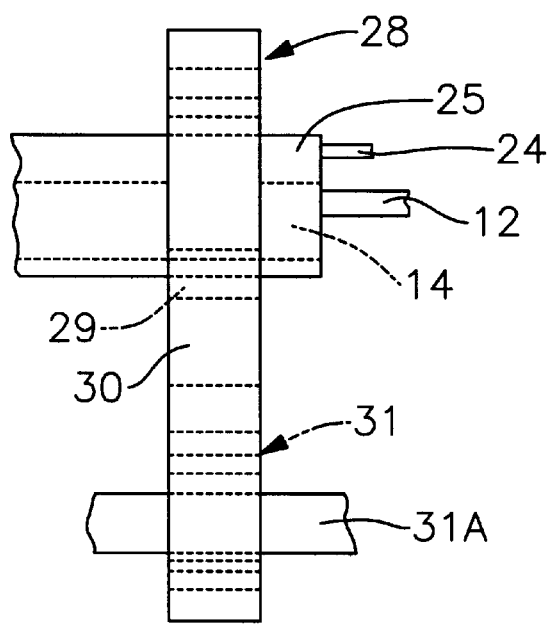
FIG. 5 is a side elevation of the center input cam output transfer assembly with portions broken away.

It will be seen that by repositioning the relative position of the outer cam 25 vis-a-vis the inner cam portion 14 effectively changes the true orbital path of the cams about the center axis of the main input shaft 12 as is best illustrated in FIG. 7 of the drawings. The cams 14 and 25 are illustrated in solid lines with the center axis of the input shaft at 12. The maximum of the adjusted orbital output paths are shown in broken lines by adjusting the relative position of cams 14 and 25, an infinite path variance can be achieved. The maximum path variance is illustrated at MPV, the minimum path or static path is illustrated at SP. As the main input shaft 12 drives the drive bracket 15 via the planetary gears 14A the adjustable ring gear 18 is fixed. The secondary set of planetary gears 17 drives the cam control gear portion 22 of the sun gear 21 at a one to one ratio with the main input shaft 12. By selective input to the worm gear 20 the variable input gear 19 moves the adjustable ring gear 18 repositioning the cam control gear portion 22 via the secondary planetary gears 17 and control sun gear 21 respectively. A second cam control gear 26 is positioned on the opposite end of the inner and outer cams 14 and 25 respectively and is interconnected to the cam control gear portion 22 of the sun gear 21 by a shaft 26A and longitudinally spaced gears 27A and 27B affixed thereto as best seen in FIGS. 1 and 3 of the drawings. The hereinbefore described orbital action of the cams 14 and 25 is transferred into usable output by a plurality of cam follower assemblies 28, best seen in FIGS. 1, and 4–6 of the drawings. Each of the cam follower assemblies 28 comprises a bearing block 29 positioned around the outer cam 25. The bearing block 29 is slideably disposed within an output fork 30 having a one-way clutch bearing assembly 31 within in spaced relation thereto as best seen in FIG. 4. Each of the cam follower assemblies 28 respond to cam input pivotally about the respective clutch bearing assemblies 31 as illustrated by the broken position lines in FIG. 6 of the drawings directing their output to the respective drive shafts 31A, 31B, 31C and 31D as set forth in this example.

Referring back to FIG. 1 of the drawings, the output of the multiple cam follower assemblies 28 are interconnected via the output gears 32 to the main cam follower output shaft 31A.

Referring now to FIG. 2 of the drawings, an engine braking assembly 32, directional control assembly 33, a differential assembly 34 and a speed increase assembly 35 can be seen. The output shaft 31A has a worm and pinion gear assembly 36 for output to the speed assembly 35 having a pair of interengaging speed gears 36A and 36B. Increased speed output which is added to compensate the RPM reaction of worm and pinion from the speed gear 36B drives a multiple input gear 38 having output gears 39 and 40 thereon. The directional control assembly 33 has a control bracket 41 with a set of planetary gears 42 thereon engageable with the hereinbefore described output gear 39. A secondary control and output bracket 43 has a ring gear portion 44 registerable with the planetary gears 42 and a second set of planetary gears 45 thereon. A directional control ring gear 46 engages the secondary set of planetary gears 45 which are in turn registerable on the output gear 40.

In operation, a pair of braking elements 47 and 48 are provided on the respective control bracket 41 and ring gear portion 46 and can be alternately activated to achieve directional output of the output bracket 43 in the following sequence.

Given the input at the output gears 39 and 40 when the brake element 47 is engaged, the control bracket 41 is fixed. Accordingly, the planetary gears 42 drive the ring gear portion 44 of the output bracket 43 in one direction.

Conversely, if the brake element 48 is engaged on the ring gear 46 and the brake element 47 is disengaged then the planetary gears 45 drive the output bracket 43 in the opposite direction.

The differential assembly 34 is comprised of the output portion of the bracket 43 having multiple bracket shafts 43A on which differential gear sets 49 and 50 are positioned. Each of the gear sets 49 and 50 have respective gears 49A, 49B and 50A and 50B, best seen in FIG. 10.

In operation, as the bracket 43 rotates the gears 49A and 50A drive output gear 51 and shaft 51A, as the gears 49B and 50B in turn drive the output gear fitting 52 and interconnected output shaft 52A.

In a vehicle application, for example, as the bracket 43 rotates, gears 51 and 52 will rotate either in the same direction as the bracket 43 if resistant from the road surface (not shown) are equal or different if the road resistant forces are unequal as would occur during a turn i.e output shaft 51 in relation to output gear shaft 52.

Respective brake disks 53 and 53A on the output shafts 52A and 51A respectively extend therefrom with corresponding braking elements 54A and 54B to effect selective control thereof.

Figure 9:
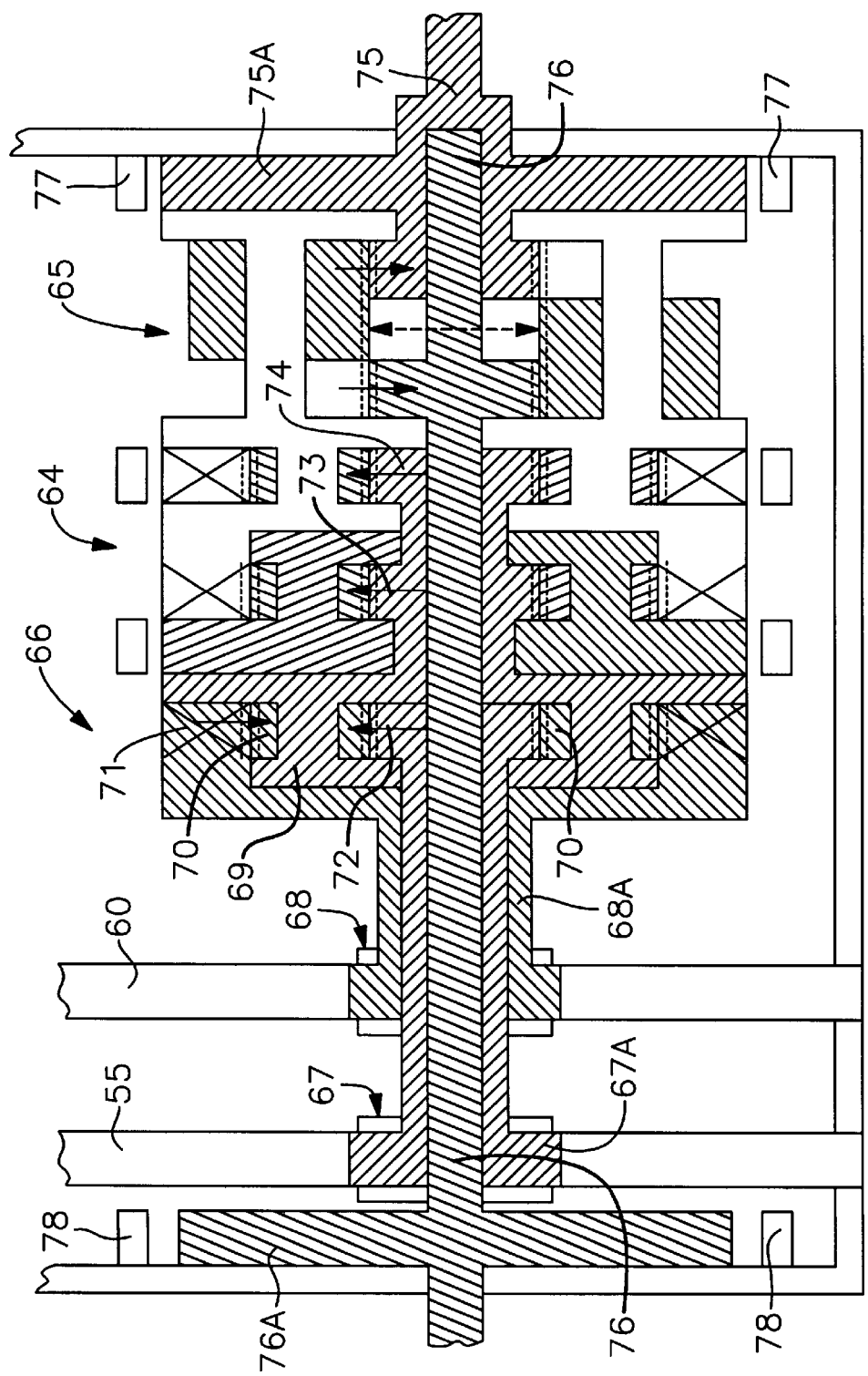
FIG. 9 is a partial cross-sectional graphic illustrative view of compensated variable speed gear assembly with engine braking, directional and differential portions thereof.
Figure 10:
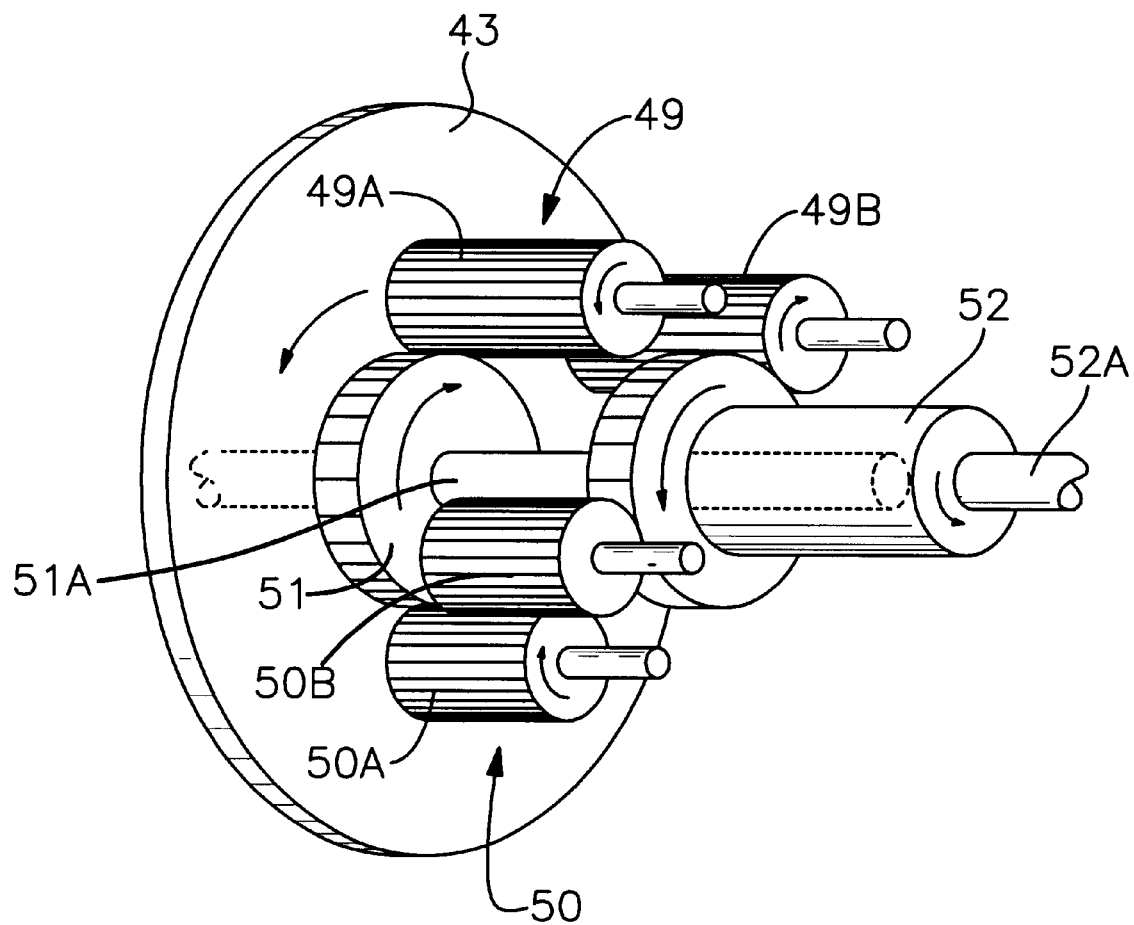
FIG. 10 is a partially exploded perspective view of the differential portion of the variable speed gear assembly.

Referring now to FIGS. 8 and 9 of the drawings, the compensated variable output gear assembly alternate form of the invention can be seen. The construction is the same as the hereinbefore described arrangement of the principle embodiment 10 with the exception of a secondary direct output shaft 55 and interconnecting gears 56 and 57 that provide for direct output from a main drive shaft 58. Additional modification is required for the output transfer from the multiple cam follower assemblies 59 to a variable output shaft 60 that corresponds to the hereinbefore described cam follower output shaft 31A. One-way clutch bearings 61 in the cam follower assemblies 59 outputs to dual pinion gears 62 and 63 that interconnects the one-way clutch bearing assemblies 61 to the output shaft 60 indicated by the directional arrows in FIG. 8 of the drawings.

Referring now to FIG. 9 of the drawings, an alternate directional assembly 64, a differential assembly 65 and a compensation assembly indicated at 66 can be seen.

Figure 11:
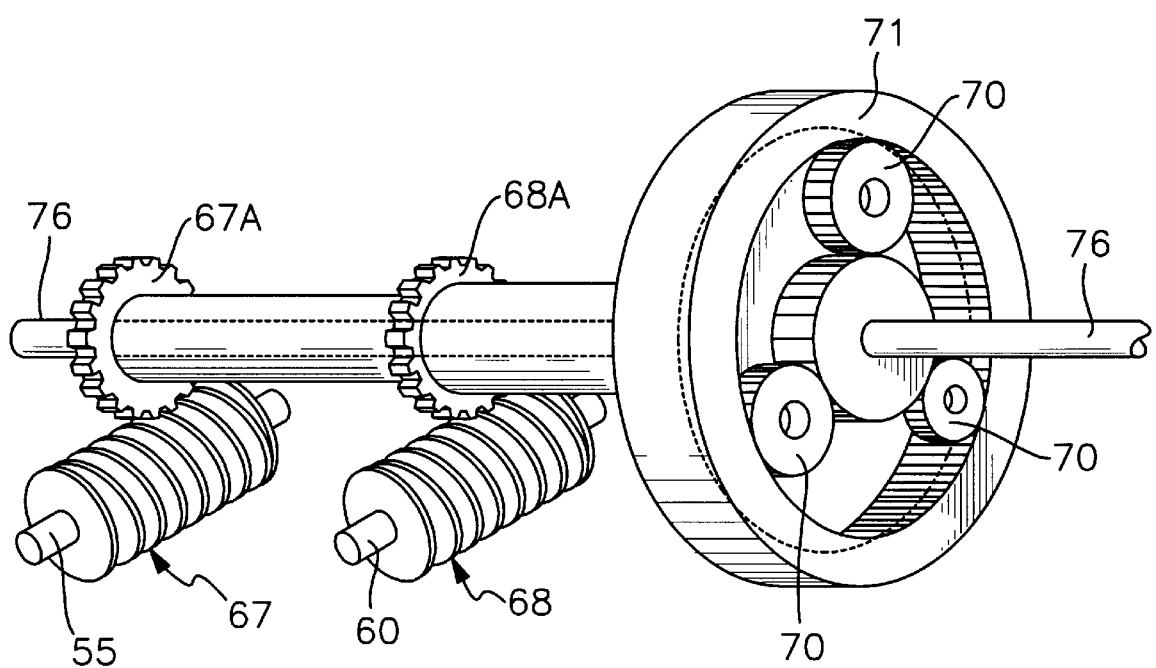
FIG. 11 is a partial perspective view of the output transfer in the compensated variable speed gear assembly.

The respective alternate direct drive output shaft 55 and variable cam output shaft 60 have corresponding worm and pinion gear assemblies 67 and 68 as also seen in FIG. 11 of the drawings. Corresponding pinion gears 67A and 68A transfer the direct drive output shaft 55 and variable cam output shaft 60 into inputs to the compensation assembly 11. The compensation assembly 66 has a compensation bracket 69 with planetary gears 70 thereon. The pinion gear 68A has a ring gear 71 extending therefrom engageable on the planetary gears 70. The pinion gear 67A has a sun gear 72 engageable with the planetary gears 70. A pair of compensated output gears 73 and 74 extend from the compensation bracket 69 interconnecting same with the alternate directional assembly 64 which is identical to the hereinbefore described directional assembly 32 illustrated in FIG. 2 of the drawings.

The effective output of the directional assembly inputs to the alternate differential assembly 64, which is identical to the differential assembly 31 noted above having a pair of corresponding disposed outlet shafts 75 and 76.

As set forth in the primary form of the invention in FIGS. 1 and 2 of the drawings, the output shaft 75 and 76 each have braking disks 75A and 75B with associated braking elements 77 and 78 for selective engagement therewith.

Figures 12, 13:
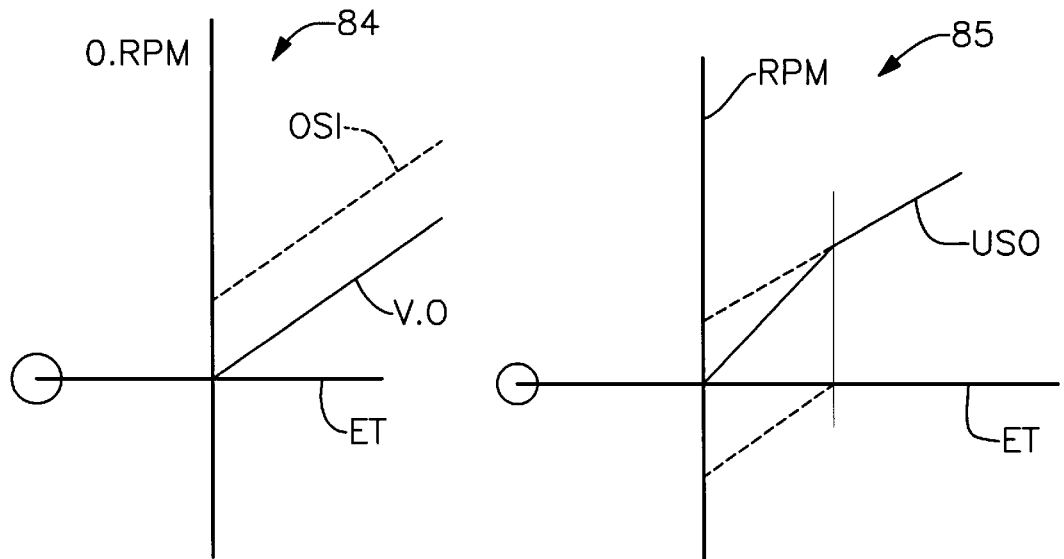
FIG. 12 is a graphic representation of the variable speed gear assembly output ratios to input.
FIG. 13 is a graph illustrating the output of the compensated variable speed transmission assembly of the invention.

Referring now to FIGS. 12 and 13 of the drawings, preference graphs 84 and 85 can be seen wherein graph 84 plots variable output (VO) of the principal embodiment 10 of the invention in relation to original source input (OSI) at the drive shaft 12 in FIG. 1 of the drawings as to RPM and engine throttle in this example.

Referring now to FIG. 13 of the drawings, the preference graph 85 plots an alternate compensated embodiment in 11 illustrating and comparing compensated variable output CVO with the uncompensated engine output VEO in relation to RPM and engine throttle ET and the transition point therebetween.

The alternate form of the variable input and original source input of RPM as an input to be compensated. The resulting compensated variable output CVO has three advantages; a. the minimum RPM is zero, b. the transition point is seamless and c. the uncompensated portion is in reality the original source input.

It thus illustrates the advantage of compensated variable output wherein power gear transmission phases out when compensation becomes zero.

Referring now to FIGS. 10A and 10B of the drawings, an alternate differential assembly 79 is illustrated wherein the hereinbefore described gear sets 49 and 50 are replaced with gear sets 80 and 81. This arrangement outputs to an alternate drive output shaft 82 and alternate output gear fitting 83. FIG. 10A of the drawings graphically illustrates the respective gear relationships and their engagement points by interconnected guide arrows.

Figure 14:
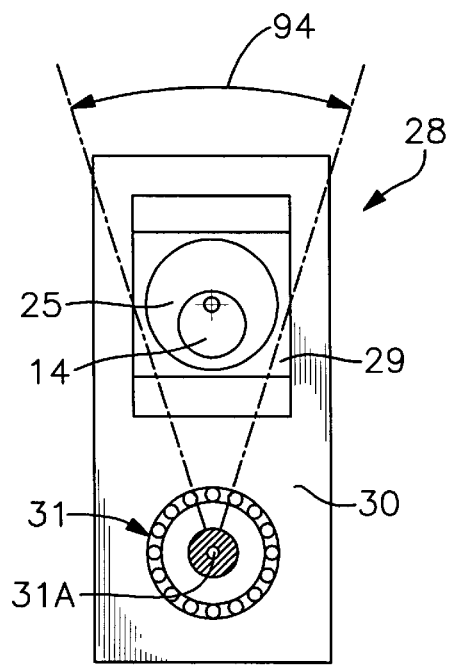
FIG. 14 is a front elevational view of a cam transfer assembly in the primary form of the invention.
Figure 15:
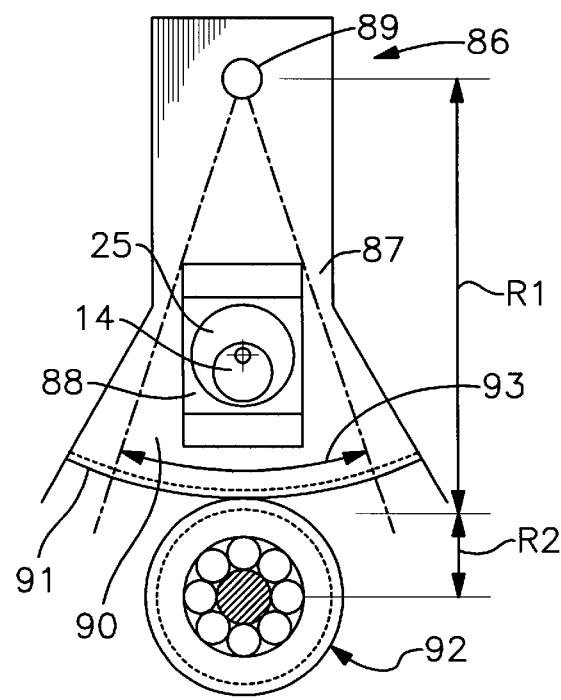
FIG. 15 is an alternate form of the cam transfer assembly.

Referring now to FIGS. 14 and 15 a comparison is shown between the principle cam follower assembly 28 as has been hereinbefore described and an alternate cam follower assembly 86 illustrated in FIG. 15 of the drawings wherein a gear drive is used. The assembly 86 has a fork 87 with a bearing block 88 within on cams 14 and 25 and a pivot point at 89. The fork 87 has a modified contoured arcuate end at 90 with a geared surface 91 thereon. A modified one away clutch bearing assembly 92 is engaged by the gear surface 91 as the fork oscillates following the bearing block 88 and respective cams 14 and 25 as will be well understood by those skilled in the art.

This alternate assembly 86 illustrates increased angle of output indicated by angle arrow 93 in comparison to angle output of the cam follower assembly 28 indicated by arrow 44. The angle output is due to the increase gear radius ratio of R1/R2 as illustrated in FIG. 15 of the drawings.

It will thus be seen that a variable and compensated variable speed transmission gearing assemblies having incremental adjustable speed output and output from a gear source with engine braking, selective directional rotation and differential output has been illustrated and described and it will be apparent to those skilled in the art that various changes and modifications may be made therein without departing from the spirit of the invention.

Therefore I claim:

1. A variable speed transmission system having an input and a variable speed and directional output comprises, a first variable output control gear assembly with engine braking, speed adjustment, directional and differential gear assemblies, and a compensated variable output control gear assembly with engine braking, speed adjustment, directional and differential gear assemblies, said first variable output control gear assembly comprising an input drive shaft with an output cam portion, an adjustable camming and drive assembly interengaging said input drive shaft and a variable gear input assembly, said adjustable camming and drive assembly having a control cam about said output cam portion and cam control gears, cam follower means interconnected to a variable speed output shaft, said engine braking assembly comprising transfer gear assemblies, said speed adjustment assemblies comprising multiple interconnecting gear ratios, said directional gear assembly of said variable output control gear assembly comprising, transfer gears interconnecting said variable speed output shaft to a first and secondary control bracket gear assemblies, selectively engageable braking means on said respective control bracket gear assemblies and said secondary control bracket gear assembly providing alternate directional output to said differential gear assembly, said differential gear assembly comprising interengaging gear sets on said secondary output bracket gear assembly and a first differential output with braking means and a second differential output with braking means.

2. The variable speed transmission system set forth in claim 1 wherein said adjustable camming and drive assembly comprises, a drive bracket having planetary gear sets thereon, one of said planetary gear sets engageable with said cam control gears and said variable input gear assembly.

3. The variable speed transmission system set forth in claim 1 wherein said variable input gear assembly comprises, a worm and pinion gear wherein said worm gear defines a variable speed input control.

4. The variable speed transmission system set forth in claim 1 wherein said cam control gears have radially positioned slots engageable with said cam on said output cam portion of said input drive shaft.

5. The variable speed transmission system set forth in claim 1 wherein said cam follower means comprises, an apertured output fork, means for slideably disposing said cam assembly within said fork, a one-way clutch bearing assembly in spaced relation thereto and radial mounting means on said cam assemblies.

6. The variable speed transmission system set forth in claim 5 wherein said means for slideably disposing said cam assembly within said output fork comprises a bearing block.

7. The variable speed transmission system set forth in claim 1 wherein said one-way bearing assembly have respective drive output shafts interconnecting to said variable speed output shaft.

8. The variable speed transmission system set forth in claim 1 wherein said first control bracket gear assembly comprises, a rotatable control bracket having a planetary gear set thereon interconnected to said transfer gears from said speed output shaft.

9. The variable speed transmission system set forth in claim 7 wherein said secondary control bracket gear assembly comprises, a ring gear portion Engageable on said planetary gear set of said first control bracket assembly, and planetary gear set extending therefrom, said planetary gear set interconnecting said transfer gears and a ring gear.

10. The variable speed transmission system set forth in claim 1 wherein said first differential output comprises, an output drive shaft having a braking disk and a gear means engageable with said interengaging gear sets on said secondary control bracket gear assembly.

11. The variable speed transmission system set forth in claim 1 wherein said second differential output comprises, an output gear shaft, gear means on said output gear shaft interconnecting said interengaging gear sets and a braking disk on said output gear shaft.

12. The variable speed transmission system set forth in claim 1 wherein said compensated variable output control gear assembly comprises an input drive shaft with an output cam portion, an adjustable camming and drive assembly interengaging said input drive shaft and a variable input gear assembly, said adjustable camming and drive assembly having a control cam about said output cam portion and cam control gears, cam follower means interconnected to variable speed output shafts, a secondary direct drive output shaft interconnected to said main input drive shaft, a transfer gear assembly interconnecting said variable speed output shaft to said secondary direct drive output shaft to said directional gear assembly of said compensated variable output control gear assembly.

13. The compensated variable speed transmission system set forth in claim 12 wherein said transfer gear assembly comprises, worm and pinion gears on said respective secondary output shaft and said independent output shaft.

14. The compensated variable speed transmission system set forth in claim 13 wherein said pinion gear on said independent output shaft has a ring gear portion engageable with a planetary gear set on a compensation bracket, multiple input gears on said compensation bracket engageable with said direct gear assembly of said compensated variable output control gear assembly.

15. The variable speed transmission system set forth in claim 12 wherein said cam follower comprises an apertured fork, a bearing block engageable on said output cam, said bearing block slideably disposed within said aperture, a gear engagement end registerable with a one-way clutch bearing.

* * * * *